(12) United States Patent
Fitzgibbon (10) Patent No.: US 10,156,634 B2
(45) Date of Patent: Dec. 18, 2018

(54) OBJECT DETECTION SYSTEM

(71) Applicant: The Chamberlain Group, Inc., Elmhurst, IL (US)

(72) Inventor: James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 574 days.

(21) Appl. No.: 14/833,838

(22) Filed: Aug. 24, 2015

(65) Prior Publication Data

US 2017/0059708 A1    Mar. 2, 2017

(51) Int. Cl.
| | |
|---|---|
| G01C 3/08 | (2006.01) |
| G01S 17/02 | (2006.01) |
| G01S 17/00 | (2006.01) |
| G01V 8/12 | (2006.01) |
| E05F 15/43 | (2015.01) |

(52) U.S. Cl.
CPC ............ *G01S 17/026* (2013.01); *E05F 15/43* (2015.01); *G01S 17/003* (2013.01); *G01V 8/12* (2013.01); *E05Y 2900/106* (2013.01)

(58) Field of Classification Search
CPC ...... G01S 17/026; G01S 17/003; E05F 15/43; G01V 8/12; E05Y 2900/106
See application file for complete search history.

(56) References Cited

U.S. PATENT DOCUMENTS

| | | | |
|---|---|---|---|
| 5,309,212 A | 5/1994 | Clark | |
| 5,508,505 A | 4/1996 | Walts | |
| 5,729,003 A | 3/1998 | Briggs, III | |
| 6,612,493 B1 | 9/2003 | Degiovine | |
| 6,624,899 B1 | 9/2003 | Clark | |
| 7,059,530 B2 | 6/2006 | Gagne | |
| 7,221,288 B2 | 5/2007 | Fitzgibbon | |
| 7,253,890 B2 | 8/2007 | Miremadi | |
| 7,798,411 B2 | 9/2010 | Gagne | |
| 2005/0133699 A1* | 6/2005 | Miremadi | G01V 8/14 250/221 |
| 2012/0026836 A1* | 2/2012 | Scripca | G01S 15/18 367/99 |
| 2014/0055234 A1* | 2/2014 | Tsui | G08C 17/02 340/5.22 |

OTHER PUBLICATIONS

Espros Photonics Corporation; Datasheet—EPC 600; 8×8 pixel 3D TOF imager; Datasheet epc610-v1.7; © 2014.

(Continued)

*Primary Examiner* — Samantha K Abraham
(74) *Attorney, Agent, or Firm* — Fitch, Even, Tabin & Flannery LLP (57) ABSTRACT

An obstacle detection system includes an emitter that emits a wide angle signal, and a receiver that receives at least a portion of the wide angle signal. The obstacle detection system also includes a memory for storing a time window and a baseline signal characteristic, and a processing device that compares attributes of the received signal to information stored in the memory. The processing device determines whether at least a portion of the emitted signal was received at the receiver within the time window. The processing device also determines whether a signal characteristic of the received signal corresponds to the baseline signal characteristic.

17 Claims, 6 Drawing Sheets

(56) References Cited

OTHER PUBLICATIONS

Espros Photonics Corporation; Handbook—EPC 600; Time-of-flight range finder clip; © 2014; http://www.espros.ch/documents/10156/97990958-990c-446f-bb59-1f8d040f328e; 28 pages.

Seltec Automation & Control Distrubutors; Sick PL6OHK (1011545) Reflector Heated (continuous) retrieved from http://www.seltec.co.uk/products/details/11866.html on Apr. 18, 2018.

TM Optics for Industray; IMOS Triheater, Heated Anti-Fog Reflector, retrieved from https://www.imos-gubela.com/en/triheater/ on Apr. 18, 2018.

* cited by examiner

OBJECT DETECTION SYSTEM

TECHNICAL FIELD

This invention relates generally to detecting the presence of an object, and more particularly, detecting the presence of an obstacle in the path of a movable barrier using a wide angle photobeam system.

BACKGROUND

Movable barrier operators generally serve to selectively move a movable barrier (such as a segmented or one-piece garage door, swinging gate, sliding gate, rolling shutter, and so forth) between an opened and a closed position using one or more motors. It is known to use safe-operation devices to detect an obstacle in the path of the moving barrier (particularly when the moving barrier moves to a closed position) through use of light, sound, radio-frequency, and/or contact sensing mechanisms. Upon sensing an obstacle, the safe-operation device provides a signal that can be used by the movable barrier operator accordingly to aid in avoiding potentially harmful contact between the movable barrier and the detected obstacle. For example, the movable barrier operator may respond by preventing barrier movement or stopping and/or reversing barrier movement. These safe-operation devices aid in ensuring that the movable barrier can be moved without undue risk to persons or property in the immediate vicinity.

One example of a safe-operation device is a photobeam system. Generally speaking, these photobeam systems include an emitter and a receiver. In "thru-beam" systems, the emitter and the receiver are disposed on opposite sides of the movable barrier. In "retro-reflective" systems, the emitter and the receiver are disposed on the same side of the movable barrier with the opposing side having a reflective surface that reflects the emitted signal back to the receiver.

The components of a photobeam system are generally disposed near the ground and the path of travel of the movable barrier. These systems are designed with a narrow angle of transmission (for example, approximately two degrees) between the emitter and the receiver. This narrow transmission angle serves to reduce the possibility of the receiver receiving signals that have reflected off of a nearby object or surface. Such reflected signals may interfere with proper detection of the presence of an obstacle.

The narrow angle of transmission required by previous photobeam systems raises several problems. For example, such systems require precise placement of the photobeam components to allow the signal to be properly received by the receiver. As such, the installation of these components may be time consuming and difficult for both end users and professional installers. Furthermore, even the slightest contact to a photobeam component on either side of the movable barrier can knock the system out of alignment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein. Furthermore, descriptions used throughout the disclosure herein can have a variety of suitable meanings. For example, the phrase "obstacle detection system" as used herein may refer to an object detector or detection system, and may refer to a photobeam apparatus or photobeam system.

DETAILED DESCRIPTION

Generally speaking, pursuant to these various embodiments, an obstacle detection system includes an emitter that is configured to emit a signal, a receiver that is configured to receive at least a portion of the signal, a memory configured to store a time window and a baseline signal characteristic, and a processing device configured to compare attributes of a received signal to information stored in the memory. In some examples, the emitter is configured to emit a signal having a transmission angle of at least 7 degrees. In other examples, the emitter is configured to emit at least one of a pulse and a continuous stream of emissions.

The processing device determines whether at least a portion of the emitted signal was received at the receiver within the time window. If no portion of the emitted signal was received within the time window, the processing device transmits a signal indicative of detection of an obstacle.

If at least a portion of the emitted signal was received within the time window, the processing device determines whether a signal characteristic of the signal corresponds to the baseline signal characteristic. If the signal characteristic does not correspond to the baseline signal characteristic, the processing device transmits a signal indicative of detection of an obstacle.

So configured, the obstacle detection system may utilize both loss of amplitude and time-of-flight systems to create a wide angle obstacle detection system that ignores untimely reflections from nearby objects. Thus, the obstacle detection system may be installed with less precision, and slight movement of the emitter and/or receiver has minimal effect on calibration of the obstacle detection system. Further, objects near the emitter and/or receiver that reflect the signal have minimal effect on detection of an object within the path between the emitter and the receiver.

Figure 1:
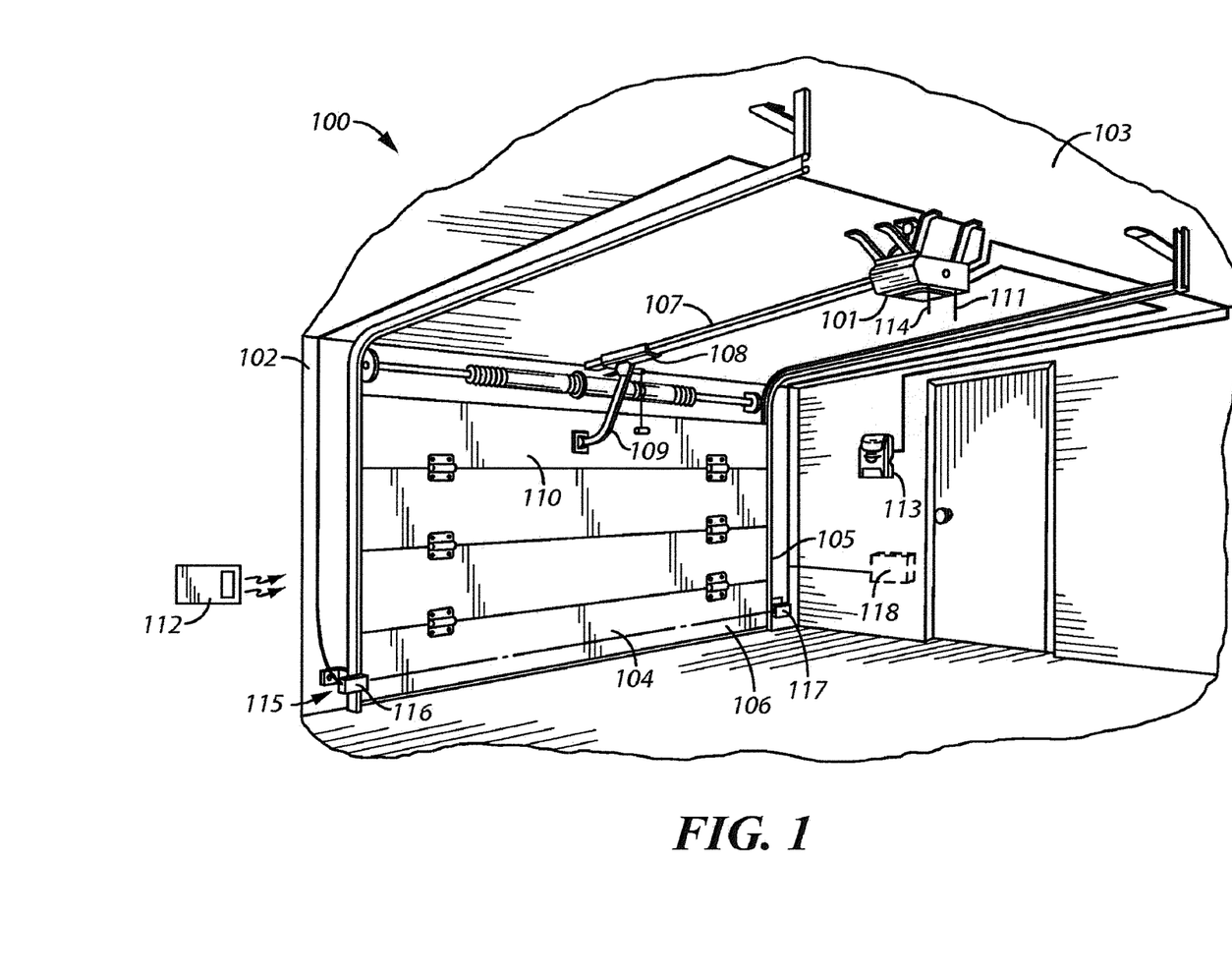
FIG. 1 comprises a perspective view of an example obstacle detection system disposed adjacent to an exemplary movable barrier as configured in accordance with various embodiments of the invention.

These and other benefits may become clearer upon making a thorough review and study of the following detailed description. Referring now to the drawings, and in particular to FIG. 1, it may be helpful to first describe an illustrative application setting. It will be understood that the specifics of this example are intended to serve only in an illustrative regard and are not intended to express or suggest any corresponding limitations with respect to the scope of these teachings.

In this illustrative example, a barrier movement system 100 includes, in part, a movable barrier operator 101 positioned within a garage 102. The movable barrier operator 101 mounts to the garage ceiling 103 and serves to control and effect selective movement of a selectively movable barrier comprising, in this illustrative example, a multi-panel garage door 104. The multi-panel garage door 104 includes a plurality of rollers (not shown) rotatably confined within a pair of tracks 105 positioned adjacent to and on opposite sides of the garage opening 106.

The movable barrier operator 101 includes a head unit having a motive component such as an electric motor (not shown) to provide motion to the garage door 104 via a rail assembly 107. The rail assembly 107 in this example includes a trolley 108 for releasable connection of the head unit to the garage door 104 via an arm 109. The arm 109 connects to an upper portion 110 of the garage door 104. The trolley 108 effects the desired movement of the door 104 via the arm 109 via a transmission that can be an endless chain, belt, or screw drive, all of which are well known in the industry. As an alternative, another head unit that is well known in the industry is a jackshaft operator that moves the barrier utilizing a counter balance system.

The head unit includes a receiver (not shown) having an antenna 111 to facilitate receiving transmissions from one or more remote platforms such as transmitter 112. Transmitter 112 may be a portable transmitter (such as a keyfob-style transmitter), a keypad transmitter (such as those often installed in automobile sun visors), a computing device (such as a personal computer or a portable computer), a mobile phone, a tablet, or other device capable of transmitting information. The receiver typically connects to a processor (not shown) in the head unit that interprets received signals and responsively controls other portions of the movable barrier operator 101.

The head unit also includes a transmitter (not shown) having an antenna 114 to facilitate transmitting transmissions to one or more remote platforms. In many application settings, the receiver and the transmitter will operate using non-overlapping and considerably different bands. Together, the receiver and transmitter comprise a transceiver.

An end-user interface 113 such as a push button-based wall control unit can communicate via wired or wirelessly transmission with the head unit to effect control of a movable barrier operator motor and other components. So configured, for example, an end user can assert the end-user interface 113 to signal to the movable barrier operator 101 that the barrier 104 should now be moved from an opened position to a closed position.

The movable barrier system 100 includes an obstacle detection system 115 in communication with the movable barrier operator 101. Communication between the obstacle detection system 115 and the movable barrier operator 101 may be via wired transmission, as shown in the illustrative example of FIG. 1, or alternatively, may be via wireless transmission.

The obstacle detection system 115 includes a first component 116 in communication with a second component 117 such that the obstacle detection system 115 detects when an obstacle is in the path of the garage door 104. The obstacle detection system 115 may also include a third component 118 that houses, for example, circuitry for operating the obstacle detection system 115 and/or for communicating with other components in the movable barrier system 100. Upon detecting an obstacle, the obstacle detection system 115 signals the movable barrier operator 101, which can then, for example, cause a reversal or opening of the door 104 to avoid contact with the obstacle.

The various components 116, 117, 118 of the obstacle detection system 115 may be coupled to a number of surfaces in a variety of environments. For example, the components 116, 117, 118 may be mounted to a ground surface, a wall surface adjacent to the passageway, and/or a portion of the movable barrier system (such as, for example, a guide rail in which the movable barrier is supported by and traverses). Other examples are possible. Accordingly, the obstacle detection system 115 may be easily retroactively installed to work in conjunction with various existing movable barrier systems 100.

Figure 2:
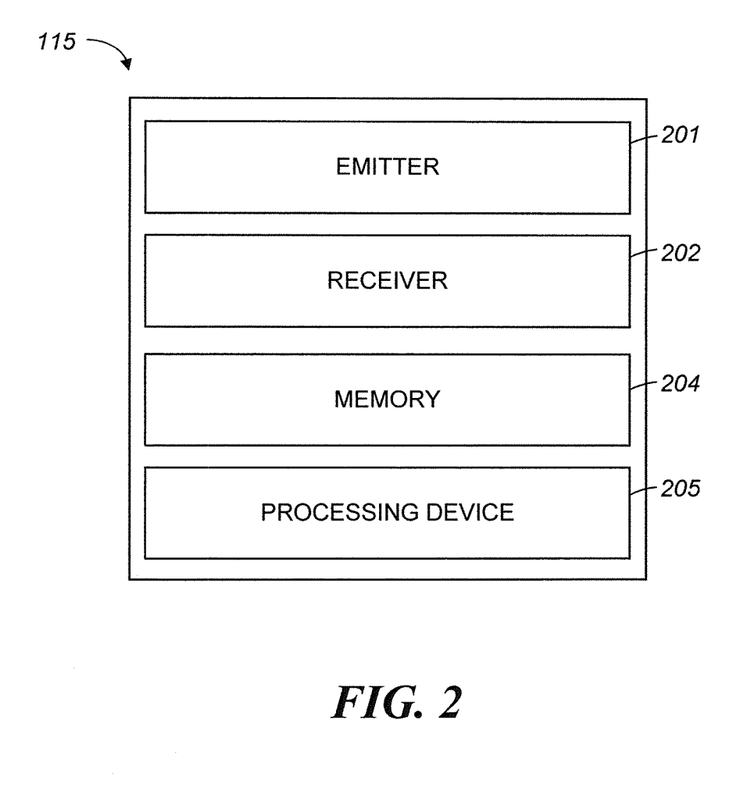
FIG. 2 comprises a block diagram of an example obstacle detection apparatus as configured in accordance with various embodiments of the invention.

Referring now to FIG. 2, the obstacle detection system 115 includes an emitter 201 configured to emit a signal, and a receiver 202 configured to receive at least a portion of the signal. In one approach, the emitter is configured to emit a "wide angle" signal having a transmission angle of at least 7 degrees.

In another approach, the signal emitted by the emitter 201 is a pulse emission signal. In yet another approach, the signal is a continuous stream of emissions.

The arrangement of the emitter 201 and the receiver 202 can be adapted to the operational needs and/or the anticipated application of the obstacle detection system 115. In one example configuration, the obstacle detection system 115 employs a thru-beam approach where the emitter 201 and the receiver 202 are positioned on opposing sides of a pathway 106 selectively blocked by a movable barrier 104. In this configuration, shown in FIG. 3, the first component 116 includes the emitter 201, and the second component 117 includes the receiver 202. The emitter 201 emits a signal that is received at the opposite side of the pathway 106 by the receiver 202.

In another example configuration, the obstacle detection system 115 employs a retro-reflective approach in which the emitter 201 and receiver 202 are positioned on a same side of the pathway 106, and a reflector 203 is positioned on the opposite side of the pathway 106. The reflector 203 (which may be a mirror, a reflective device, or a retransmission device) reflects the signal emitted from the emitter 201 back to the receiver 202. In this configuration, shown in FIG. 5, the first component 116 includes the emitter 201 and the receiver 202, and the second component 117 includes the reflector 203. This configuration reduces the necessary wiring in the garage 102, as only the first component 116 needs to be wired for power and information transfer. Reducing the number of wires often serves to improve ease of installation, and often results in a cheaper and more cost-efficient apparatus.

Referring again to FIG. 2, the obstacle detection system 115 also includes a memory 204. The memory may be located at the first component 116 or the second component 117, or may instead be located the third component 118.

The memory 204 stores one or more time windows. A time window is representative of the time range within which a direct-path signal is expected to be received at the receiver 202. That is, when no obstructions are present in the path of the door 104, the direct-path signal emitted by the emitter 201 should be received at the receiver 202 within the stored time window.

As used herein, a direct-path signal is a signal transmitted from one component of the obstacle detection system 115 to another where the signal does not reflect off of an object or intermediary surface. In the thru-beam approach, shown in FIG. 3, a direct-path signal is a signal 206 emitted by the emitter 201 and received by the receiver 202, where the signal does not reflect off of an object or intermediary surface (such as door 104). In the retro-reflective approach, shown in FIG. 5, a direct-path signal is a signal 208 emitted by the emitter 201, reflected by the reflector 203, and received by the receiver 202, where the signal does not reflect off of an object (such as object 210 or 212) or intermediary surface.

The time window stored in the memory 204 is defined by a first time, e.g., "start" time $t_1$, and a second time, e.g., "stop" time $t_2$. In one approach, the time window is defined by first determining time-of-flight information of a direct-path signal. Time-of-flight information represents the duration of time between the original sourcing of the signal to a time of detecting its corresponding reception. Direct-path time-of-flight therefore refers to the time it takes a signal transmitted from one component of the obstacle detection system 115 to another where the signal does not reflect off of an object or intermediary surface. Determination of a direct-path time-of-flight may be done using a time-of-flight calculation device, as described for example in U.S. Pat. No. 7,221,288, which is incorporated by reference in its entirety herein.

Upon determining time-of-flight information of a direct-path signal, the time window is defined. In some approaches, a reference time-of-flight is used to set the time window. This reference time can be, as an example, an initial measurement, a long term average, the strongest signal, or any other approach for providing a reference time. This reference time can be stored in the memory 204 for future use.

The time window may be defined to allow for slight variances in direct-path times-of-flight. This may be provided as a function of a variance in calculated distance traveled, e.g., +/−½ inch. For example, where a reference time-of-flight used to set the time window is defined as the equivalent of 9 feet, 6½ inches, the time window may be defined so as to include any signal having a distance within 9 feet, 6 inches and 9 feet, 7 inches. This defined time window is then stored in the memory 204. In some aspects, the defined time window is automatically provided for storage in the memory 204. In other aspects, the defined time window is manually provided for storage in the memory 204.

The memory 204 also stores one or more baseline signal characteristics or baseline signal characteristic ranges. Similar to the time window stored in the memory 204, a baseline signal characteristic includes information representative of a direct-path signal sent between the components of the obstacle detection system 115. That is, when no obstructions are present in the path of the door 104, the signal received at the receiver 202 should have defined signal characteristics or should have characteristics that fall within a defined signal characteristics range.

In one approach, the baseline signal characteristic is a signal amplitude (or, in the case of baseline signal characteristic ranges, is a signal amplitude range). In the thru-beam approach, the stored signal amplitude is an amplitude that corresponds to a signal received at the receiver 202 directly from the emitter 201. In the retro-reflective approach, the stored signal amplitude is an amplitude that corresponds to a signal received at the receiver 202 after the signal has traveled uninterrupted from the emitter 201 to the reflector 203, and uninterrupted from the reflector 203 to the receiver 201. In either approach, the stored baseline signal characteristic is an amplitude (or amplitude range) that corresponds to a signal that has not reflected off of an object or intermediary surface. As an example, a signal strength would be recorded, and an interruption would be considered a decrease in amplitude relative to the recording.

In another approach, the baseline signal characteristic is a travel distance of a signal. In another approach, the baseline signal characteristic is a Doppler shift of a signal. In another approach, the baseline signal characteristic is a phase shift calculation. In yet another approach, the baseline signal characteristic is a frequency modulation. In still another approach, the baseline signal characteristic is a time of flight calculation.

The baseline signal characteristic and/or the time window may be programmed in the memory 204 prior to an initial use of the obstacle detection system 115, for example, upon manufacturer or upon initial installation. In some approaches, a plurality of distances corresponding to standard garage door lengths are programmed in the memory 204 upon manufacture. Upon installation, an installer selects the appropriate distance for the installation.

The obstacle detection system 115 also includes a processing device 205. The processing device 205 includes circuitry operatively coupled to the emitter 201, the receiver 202, and the memory 204 such that the processing device 205 receives information from the emitter 201, the receiver 202, and the memory 204 directly or indirectly. The processing device 205 may be operatively connected to the emitter 201, the receiver 202, and/or the memory 204 via wired or wireless communication mediums. This flexibility allows the arrangement of the processing device 205 to be adapted to the operational needs and/or the anticipated application of the obstacle detection system 115. In one example, the processing device 205 is incorporated in the first component 116, is in wired communication with the emitter 201, and is in wired or wireless communication with the receiver 202 located at the second component 117. In another example, the processing device 205 is incorporated in the second component 117, is in wired communication with the receiver 202, and is in wired or wireless communication with the emitter 201 located at the first component 116. In yet another example, the processing device 205 is incorporated in a third component 118 of the obstacle detector system 115, and is in wired or wireless communication with one or both of the emitter 201 and the receiver 202.

The processing device 205 determines whether at least a portion of the signal emitted by the emitter 201 was received at the receiver 202 within the time window stored in the memory 204. Upon determining at least a portion of the signal was not received within the time window, the processing device 205 effects transmission of a signal indicative of detection of an obstacle. For example, the processing device 205 may effect a transmitter (not shown) to transmit the signal to the movable barrier operator 101. The movable barrier operator 101 may then respond by preventing barrier movement or stopping and/or reversing barrier movement.

For signals received at the receiver 202, the processing device 205 can determine a signal-received time by implementing a time-of-flight analysis. The processing device 205 then compares the signal-received time to the time window stored in the memory 204 to determine whether the portion of signal was received within the time window. Signals received by the receiver 202 outside of the time window are ignored, as discussed in greater detail below.

The processing device 205 also compares a characteristic of the signal received at the receiver 202 to the baseline signal characteristic stored in the memory 204. More specifically, the processing device 205 compares a characteristic of the portion of the signal received within the time window to the baseline signal characteristic. In doing so, the processing device 205 determines whether the signal characteristic corresponds to the baseline signal characteristic. Where the stored baseline signal characteristic is a defined parameter, the received signal characteristic "corresponds" to the parameter when it matches the parameter. Where the stored baseline signal characteristic is a defined parameter range, the received signal characteristic "corresponds" to the parameter range when it falls within the parameter range.

For example, the baseline signal characteristic may be a signal amplitude range, such as 80%-100% of a direct-path signal amplitude. In this example, a signal received at the receiver 202 having a signal amplitude of 85% of a direct-path signal amplitude would fall within the predetermined range, and thus would correspond to the baseline signal characteristic. However, a signal received at the receiver 202 having a signal amplitude of 75% of a direct-path signal amplitude would not fall within the predetermined range, and thus would not correspond to the baseline signal characteristic. Such a reduction in amplitude is indicative of an obstacle in the path of the door 104.

Upon determining the signal characteristic of the signal corresponds to the baseline signal characteristic, the processing device 205 is configured to effect transmission of an "all clear" signal. For example, the processing device 205 may effect a transmitter (not shown) to transmit the signal to the movable barrier operator 101.

Upon determining the signal characteristic of the signal does not correspond to the baseline signal characteristic, the processing device 205 is configured to effect transmission of a signal indicative of detection of an obstacle. For example, the processing device 205 may effect a transmitter (not shown) to transmit the signal to the movable barrier operator 101. The movable barrier operator 101 may then respond by preventing barrier movement, or stopping and/or reversing barrier movement.

Figure 3:
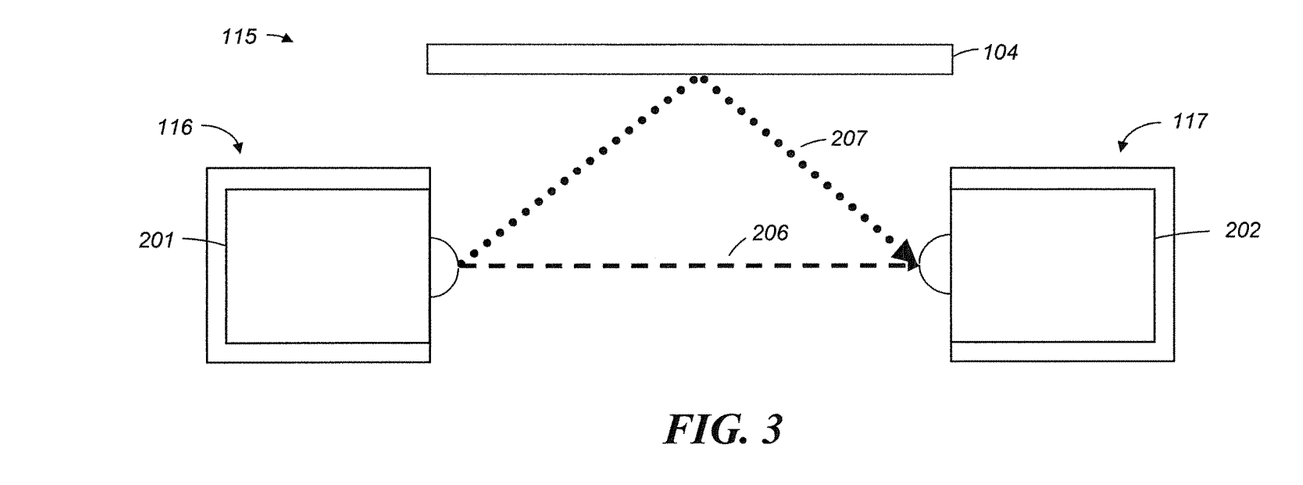
FIG. 3 comprises a schematic diagram of an example obstacle detection apparatus as configured in accordance with various embodiments of the invention.
Figure 4:
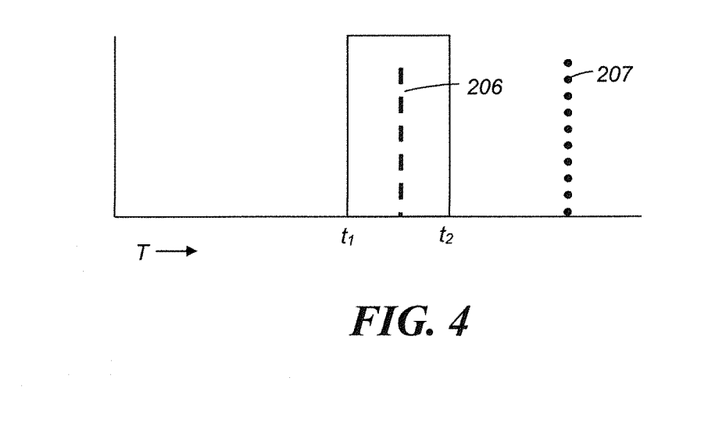
FIG. 4 comprises a diagram showing an example time window as used with the example obstacle detection apparatus of FIG. 3.

With reference to FIGS. 3 and 4, an example operation of a thru-beam obstacle detection system 115 will now be discussed. In this example, the emitter 201 and the receiver 202 are located on opposite sides of the garage opening 106. Based on a time-of-flight analysis, as discussed elsewhere herein, the processing device 205 expects the receiver 202 to receive a direct-path signal 206 within a time window defined by "start" time $t_1$ and "stop" time $t_2$. This time window is stored in the memory 204.

During operation, the emitter 201 emits a wide-angle signal that includes signals 206 and 207. The processing device 205 determines whether at least a portion of the wide-angle signal was received at the receiver 202 within the stored time window. If no portion of the wide-angle signal was received within the stored time window, the processing device 205 effects transmission of a signal indicative of detection of an obstacle.

With reference to the example diagram of FIG. 4, the processing device 205 determines at least a portion of the wide-angle signal (signal 206) was received within the stored time window. The processing device 205 then determines whether a signal characteristic of signal 206 corresponds to the baseline signal characteristic stored in the memory 204. If the signal characteristic of signal 206 corresponds to the baseline signal characteristic (i.e., matches the baseline signal characteristic or falls within the baseline signal characteristic range), the processing device 205 optionally effects transmission of an "all clear" signal to the movable barrier operator 101. However, if the signal characteristic of signal 206 does not correspond to the baseline signal characteristic, the processing device 205 effects transmission of a signal indicative of detection of an obstacle to the movable barrier operator 101. The movable barrier operator 101 may then respond by preventing barrier movement, or stopping and/or reversing barrier movement.

As shown in FIGS. 3 and 4, the receiver 202 receives multiple portions of the wide-angle signal emitted from the emitter 201: signal 206 and signal 207. Because the direct-path signal 206 does not reflect off of an object or intermediary surface (such as door 104), the direct-path signal 206 is received at the receiver 202 before reflected signal 207. Upon receiving reflected signal 207, the processing device 205 determines whether signal 207 was received within the stored time window. As shown in FIG. 4, signal 207 was not received within the stored time window (defined by "start" time $t_1$ and "stop" time $t_2$). The processing device 205 is therefore configured to ignore signal 207.

Because the processing device 205 continuously monitors for timely signals that correspond to the stored baseline signal characteristic (which signals are indicative of a clear doorway opening 106), the processing device 205 may ignore untimely signals (e.g., signal 207) without comprising the safe-operation benefits of the obstacle detection system 115.

Thus, the thru-beam approach of FIGS. 3 and 4 allows the emitter 201 to emit a wide-angle signal, while reducing confusion that would otherwise arise as the result of reflected signals received at the receiver 202.

Figures 5, 6:
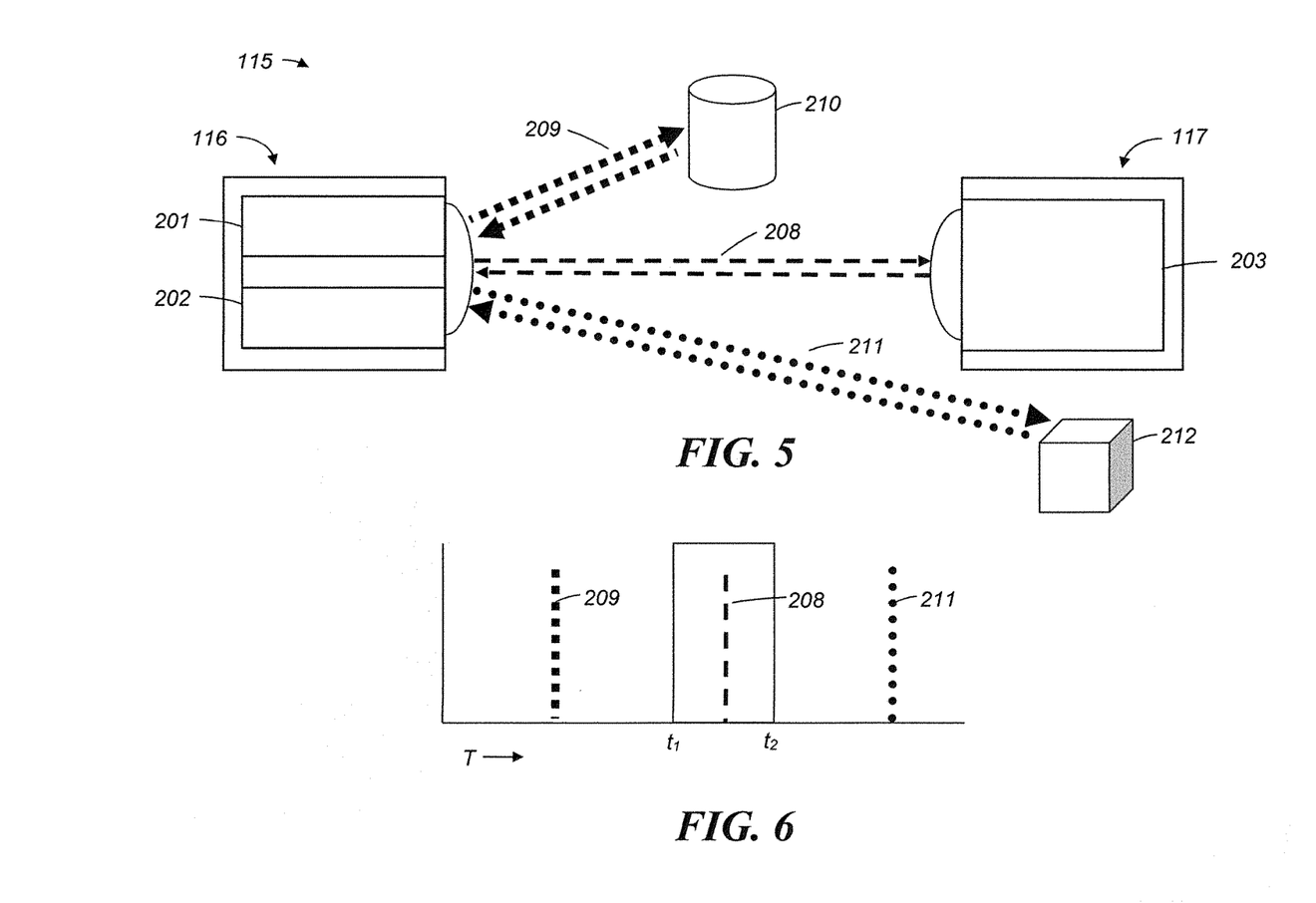
FIG. 5 comprises a schematic diagram of another example obstacle detection apparatus as configured in accordance with various embodiments of the invention.
FIG. 6 comprises a diagram showing an example time window as used with the example obstacle detection apparatus of FIG. 5.

With reference to FIGS. 5 and 6, an example operation of a retro-reflective obstacle detection system 115 will now be discussed. In this example, the emitter 201 and the receiver 202 are located on the same side of the garage opening 106. A reflector 203 is located on the opposite side of the garage opening 106 and reflects a signal emitted by the emitter 201 back to the receiver 202. Based on a time-of-flight analysis, as discussed elsewhere herein, the processing device 205 expects the receiver 202 to receive a direct-path signal 208 within a time window defined by "start" time $t_1$ and "stop" time $t_2$. This time window is stored in the memory 204.

During operation, the emitter 201 emits a wide-angle signal that includes signals 208, 209, and 211. The processing device 205 determines whether at least a portion of the wide-angle signal was received at the receiver 202 within the stored time window. If no portion of the wide-angle signal was received within the stored time window, the processing device 205 effects transmission of a signal indicative of detection of an obstacle.

With reference to the example diagram of FIG. 6, the processing device 205 determines at least a portion of the wide-angle signal (signal 208) was received within the stored time window. The processing device 205 then determines whether a signal characteristic of signal 208 corresponds to the baseline signal characteristic stored in the memory 204. If the signal characteristic of signal 208 corresponds to the baseline signal characteristic (i.e., matches the baseline signal characteristic or falls within the baseline signal characteristic range), the processing device 205 optionally effects transmission of an "all clear" signal to the movable barrier operator 101. However, if the signal characteristic of signal 208 does not correspond to the baseline signal characteristic, the processing device 205 effects transmission of a signal indicative of detection of an obstacle to the movable barrier operator 101. The movable barrier operator 101 may then respond by preventing barrier movement, or stopping and/or reversing barrier movement.

As shown in FIGS. 5 and 6, the receiver 202 receives multiple portions of the wide-angle signal emitted from the emitter 201: signal 208, signal 209 and signal 211. Because the signal 209 reflects off of an object 210 that is positioned closer to the receiver 202 than the reflector 203, reflected signal 209 is received at the receiver 202 before the direct-path signal 208. Upon receiving reflected signal 209, the processing device 205 determines whether the signal 209 was received within the stored time window. As shown in FIG. 6, signal 209 was not received within the stored time window (defined by "start" time $t_1$ and "stop" time $t_2$). The processing device 205 is therefore configured to ignore signal 209.

As further shown in FIG. 5, signal 211 reflects off of an object 212 that is positioned further from the receiver 202 than the reflector 203. Thus, reflected signal 211 is received at the receiver 202 after the direct-path signal 208. Upon receiving reflected signal 211, the processing device 205 determines whether the signal 211 was received within the stored time window. As shown in FIG. 6, signal 211 was not received within the stored time window (defined by "start" time $t_1$ and "stop" time $t_2$). The processing device 205 is therefore configured to ignore signal 211.

Similar to the thru-beam system discussed above, because the processing device 205 continuously monitors for timely signals that correspond to the stored baseline signal characteristic (which signals are indicative of a clear doorway opening 106), the processing device 205 may ignore untimely signals (e.g., signals 209, 211) without comprising the safe-operation benefits of the obstacle detection system 115.

Thus, the retro-reflective approach of FIGS. 5 and 6 allows the emitter 201 to emit a wide-angle signal, while reducing confusion that would otherwise arise as the result of reflected signals received at the receiver 202.

Figure 7:
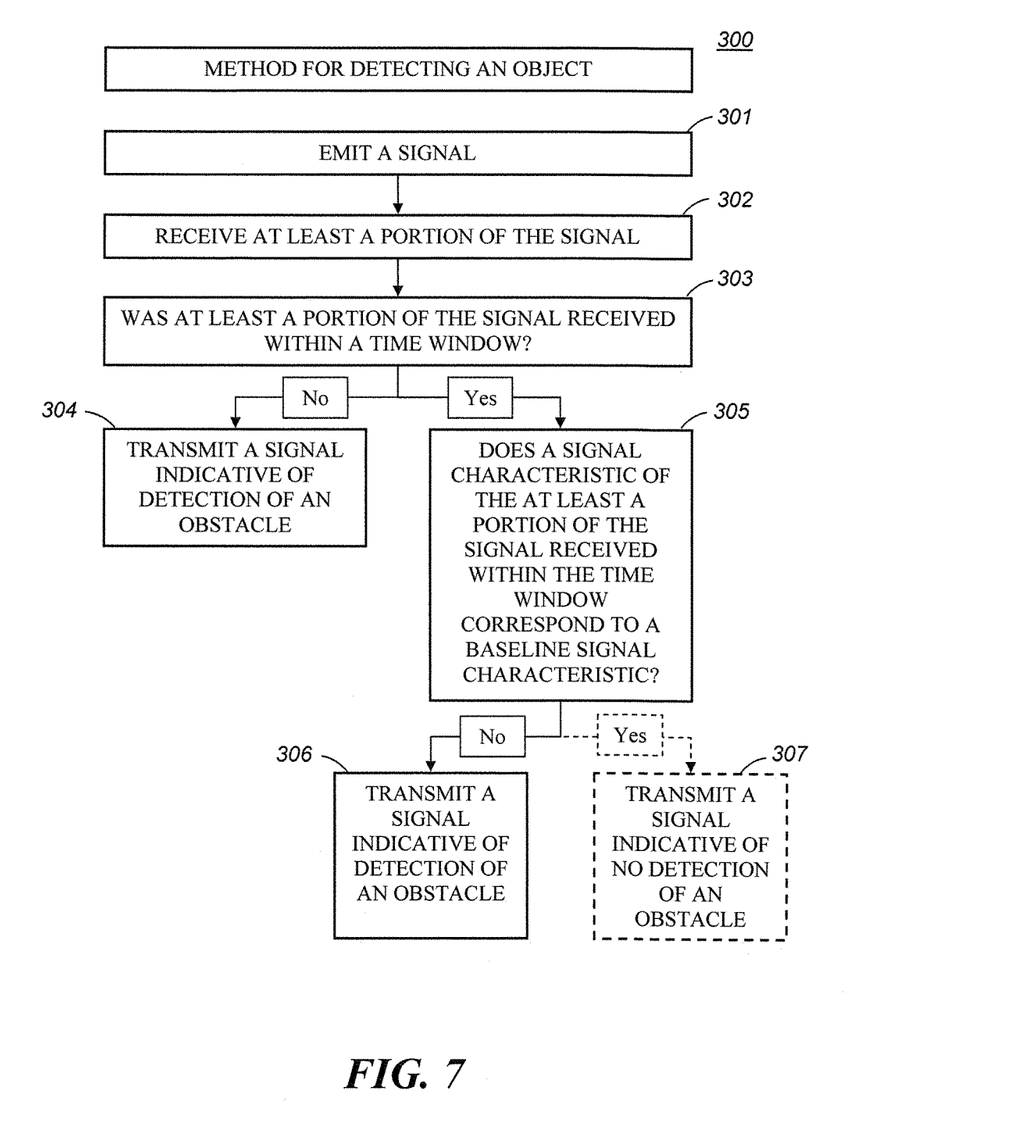
FIG. 7 comprises a flow diagram of a method of detecting an object as configured in accordance with various embodiments of the invention.

Turning now to FIG. 7, a method 300 for detecting an object includes emitting 301 a signal and receiving 302 at least a portion of the signal. The method further includes determining 303 whether at least a portion of the signal was received within a time window. The time window is defined by a first time and a second time, and is representative of the time in which a direct-path signal emitted from the emitter is received at the receiver.

In response to determining at least a portion of the signal was not received within the time window, the method includes transmitting 304 a signal indicative of detection of an obstacle.

In response to determining at least a portion of the signal was received within the time window, the method includes determining 305 whether a signal characteristic of the at least a portion of the signal received within the time window corresponds to a baseline signal characteristic. The baseline signal characteristic is representative of a signal characteristic of a direct-path signal emitted from the emitter and received at the receiver.

In response to determining the signal characteristic of the at least a portion of the signal received within the time window does not correspond to the baseline signal characteristic, the method includes transmitting 306 a signal indicative of detection of an obstacle.

In an optional approach, in response to determining the signal characteristic of the at least a portion of the signal received within the time window does correspond to the baseline signal characteristic, the method includes transmitting 307 a signal indicative of no detection of an obstacle.

In another optional approach, the method includes storing at least one of the baseline signal characteristic and the time window in a memory.

Figure 8:
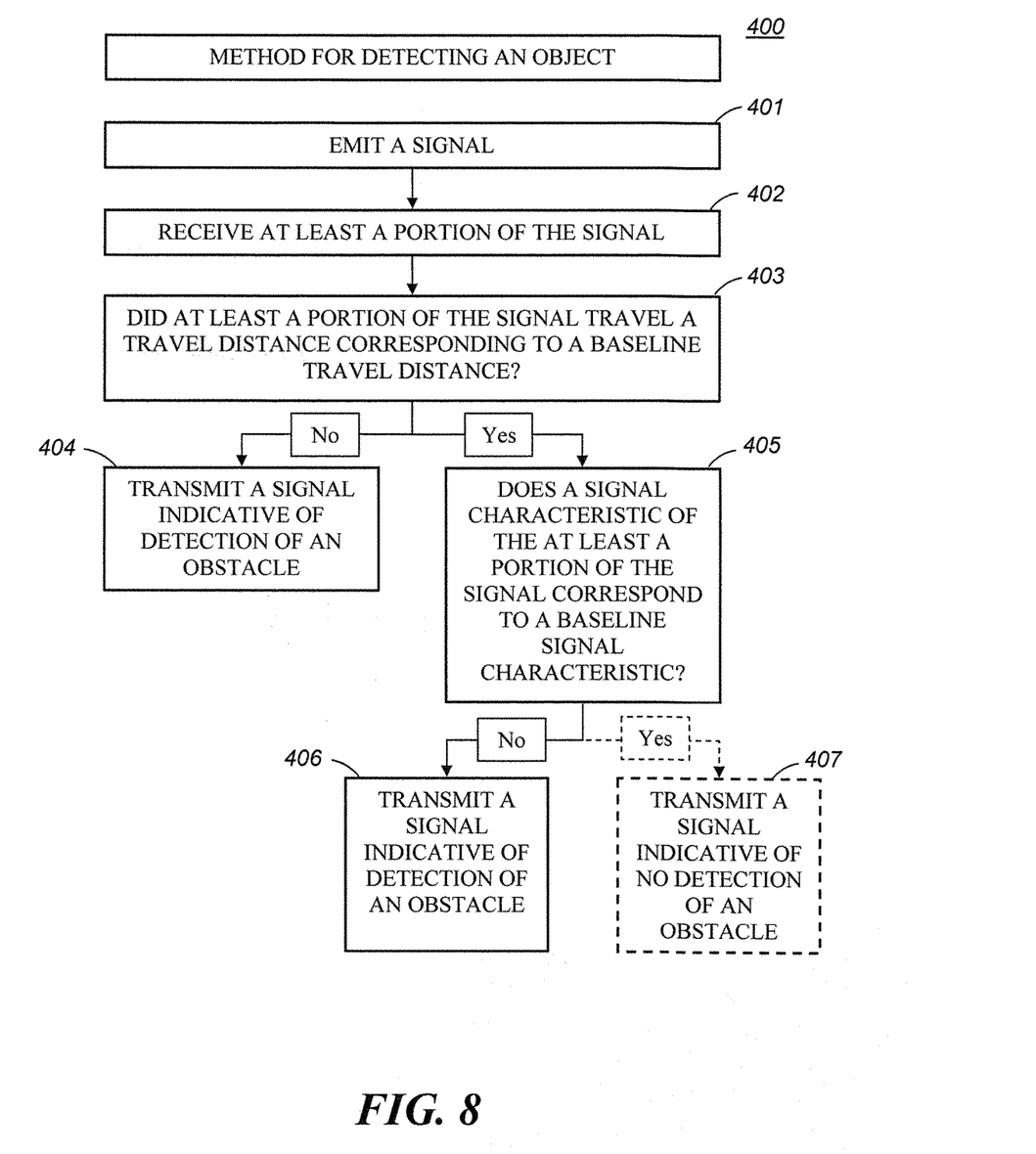
FIG. 8 comprises a flow diagram of a method of detecting an object as configured in accordance with various embodiments of the invention.

Turning now to FIG. 8, a method 400 for detecting an object includes emitting 401 a signal and receiving 402 at least a portion of the signal. The method further includes determining 403 whether at least a portion of the signal traveled a travel distance corresponding to a baseline travel distance. The baseline travel distance is representative of the distance in which a direct-path signal emitted from the emitter travels before it is received at the receiver.

In response to determining no portion of the signal traveled a travel distance corresponding to the baseline travel distance, the method includes transmitting 404 a signal indicative of detection of an obstacle.

In response to determining at least a portion of the signal traveled a travel distance corresponding to a baseline travel distance, the method includes determining 405 whether a signal characteristic of the at least a portion of the signal corresponds to a baseline signal characteristic. The baseline signal characteristic is representative of a signal characteristic of a direct-path signal emitted from the emitter and received at the receiver.

In response to determining the signal characteristic of the at least a portion of the signal does not correspond to the baseline signal characteristic, the method includes transmitting 406 a signal indicative of detection of an obstacle.

In an optional approach, in response to determining the signal characteristic of the at least a portion of the signal does correspond to the baseline signal characteristic, the method includes transmitting 407 a signal indicative of no detection of an obstacle.

In another optional approach, the method includes storing at least one of the baseline signal characteristic and the baseline travel distance in a memory.

The approaches described herein allow for an emitter of an obstacle detection system to emit a wide-angle signal, while reducing confusion that would otherwise arise as the result of reflected signals received at the receiver.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:
1. An obstacle detection system comprising:
an emitter configured to emit a signal;
a receiver configured to receive at least a portion of the signal;

a memory configured to store a baseline time window defined by a first time and a second time, the baseline time window representative of an unobstructed direct-path signal emitted from the emitter and received at the receiver, the memory further configured to store a baseline signal characteristic further representative of at least one of a phase and a frequency of the unobstructed direct-path signal emitted from the emitter and received at the receiver;

a processing device configured to operatively couple to the emitter, the receiver, and the memory, the processing device further configured to:

determine whether at least a portion of the signal was received within the baseline time window; and determine whether a signal characteristic of the at least a portion of the signal received within the baseline time window corresponds to the baseline signal characteristic representative of the at least one of the phase and the frequency of the unobstructed direct-path signal;

wherein upon determination that at least a portion of the signal was not received within the baseline time window, the processing device is configured to effect transmission of a signal indicative of detection of an obstacle; and wherein upon determination that the signal characteristic of the at least a portion of the signal received within the baseline time window does not correspond to the baseline signal characteristic representative of the at least one of the phase and the frequency of the unobstructed direct-path signal, the processing device is configured to effect transmission of a signal indicative of detection of an obstacle.

2. The obstacle detection system of claim 1, wherein the emitter is configured to emit a signal having a transmission angle of at least 7 degrees.

3. The obstacle detection system of claim 1, wherein the emitter is configured to emit at least one of a pulse and a continuous stream of emissions.

4. The obstacle detection system of claim 1, wherein the processing device is configured to determine whether the signal characteristic of the at least a portion of the signal received within the baseline time window corresponds to the baseline signal characteristic comprises calculation of at least one of a Doppler shift and a phase shift.

5. The obstacle detection system of claim 1, wherein the baseline signal characteristic comprises a baseline signal characteristic range of approximately 80-100% of the baseline signal characteristic.

6. The obstacle detection system of claim 1, wherein upon determining the signal characteristic of the at least a portion of the signal received within the baseline time window does correspond to the baseline signal characteristic, the processing device is configured to effect transmission of a signal indicative of no detection of an obstacle.

7. The obstacle detection system of claim 1, wherein the emitter and the receiver are positioned on opposing sides of a movable barrier.

8. The obstacle detection system of claim 1, wherein the emitter and the receiver are positioned on a same side of a movable barrier.

9. The obstacle detection system of claim 1, wherein upon transmitting the signal indicative of detection of the obstacle, movement of a movable barrier is stopped.

10. A method for detecting an object comprising:
emitting a signal from an emitter;
receiving at least a portion of the signal at a receiver;
determining whether at least a portion of the signal was received within a baseline time window, the baseline time window defined by a first time and a second time and representative of an unobstructed direct-path signal emitted from the emitter and received at the receiver;
in response to determining the at least a portion of the signal was not received within the baseline time window, transmitting a signal indicative of detection of an obstacle;
in response to determining the at least a portion of the signal was received within the baseline time window, determining whether a signal characteristic of the at least a portion of the signal received within the baseline time window corresponds to a baseline signal characteristic, the baseline signal characteristic representative of at least one of a phase and a frequency of the unobstructed direct-path signal emitted from the emitter and received at the receiver; and
in response to determining the signal characteristic of the at least a portion of the signal received within the baseline time window does not correspond to the baseline signal characteristic representative of the at least one of the phase and the frequency of the unobstructed direct-path signal, transmitting a signal indicative of detection of an obstacle.

11. The method of claim 10, further comprising:
in response to determining the signal characteristic of the at least a portion of the signal received within the baseline time window does correspond to the baseline signal characteristic, transmitting a signal indicative of no detection of an obstacle.

12. The method of claim 10, further comprising:
storing at least one of the baseline signal characteristic and the baseline time window in a memory.

13. The method of claim 10, wherein determining whether the signal characteristic of the at least a portion of the signal received within the baseline time window corresponds to the baseline signal characteristic includes calculating at least one of a doppler shift and a phase shift.

14. A method for detecting an object comprising:
emitting a signal from an emitter;
receiving at least a portion of the signal at a receiver;
determining whether at least a portion of the signal traveled a travel distance corresponding to a baseline travel distance representative of an unobstructed direct-path signal emitted from the emitter and received at the receiver;
in response to determining no portion of the signal traveled a travel distance corresponding to the baseline travel distance, transmitting a signal indicative of detection of an obstacle;
in response to determining at least a portion of the signal traveled a travel distance corresponding to the baseline travel distance, determining whether a signal characteristic of the at least a portion of the signal corresponds to a baseline signal characteristic, the baseline signal characteristic representative of at least one of a phase and a frequency of the unobstructed direct-path signal emitted from the emitter and received at the receiver; and
in response to determining the signal characteristic of the at least a portion of the signal does not correspond to the baseline signal characteristic representative of the at least one of the phase and the frequency of the unobstructed direct-path signal, transmitting a signal indicative of detection of an obstacle.

15. The method of claim 14, further comprising:
in response to determining the signal characteristic of the at least a portion of the signal does correspond to the baseline signal characteristic, transmitting a signal indicative of no detection of an obstacle.

16. The method of claim 14, further comprising:
storing at least one of the baseline signal characteristic and the baseline travel distance in a memory.

17. The method of claim 14, wherein determining whether the signal characteristic of the at least a portion of the signal corresponds to the baseline signal characteristic includes calculating at least one of a doppler shift and a phase shift.

\* \* \* \* \*